United States Patent [19]
Saxena et al.

[11] Patent Number: 5,893,926
[45] Date of Patent: Apr. 13, 1999

[54] DATA BUFFERING TECHNIQUE IN COMPUTER SYSTEM

[75] Inventors: Ashok R. Saxena, San Jose, Calif.; George W. Wilhelm, Jr., Endwell, N.Y.

[73] Assignee: International Business Machines Corporation, Armonk, N.Y.

[21] Appl. No.: 08/569,528

[22] Filed: Dec. 8, 1995

[51] Int. Cl.[6] ........................................ G06F 12/02
[52] U.S. Cl. .................. 711/170; 711/202; 395/681; 395/876; 395/709; 395/674
[58] Field of Search ........................... 395/681, 709, 395/497.01, 876, 674, 412, 200.08, 474, 475

[56] References Cited

U.S. PATENT DOCUMENTS

| | | | |
|---|---|---|---|
| 5,535,390 | 7/1996 | Hildebrandt | 711/154 |
| 5,555,377 | 9/1996 | Christensen et al. | 395/200.11 |
| 5,590,313 | 12/1996 | Reynolds et al. | 395/500 |
| 5,615,392 | 3/1997 | Harrison et al. | 395/876 |

OTHER PUBLICATIONS

Ranelletti, John, "Graph Transformation Algorithms for Array Memory Optimization in Applicative Languages", UMI, 1987; pp. 26–28, 39–50 and 97–99, Dec. 1987.

Primary Examiner—Reginald G. Bragdon
Attorney, Agent, or Firm—Arthur J. Samodovitz

[57] ABSTRACT

A computer system executes an application that requires transfer of data to or from the computer system. The system responds to requests from the application, by allocating storage for a data buffer, verifying that the application is authorized to access the buffer, converting an address of the buffer utilized by the application to a corresponding system address and mapping the system buffer address to an index. The system also responds to a subsequent transmit or receive request from the application, by accessing the data buffer based on the index such that no storage allocation, address conversion, or access verification is required for the transmit or receive request after the transmit or receive request is made. The computer system includes a communications adapter at an input or output port and the data is transferred between the communications adapter and the buffer without any intermediary buffering. Thus, the transmit and receive requests are processed expeditiously.

20 Claims, 10 Drawing Sheets

DATA BUFFERING TECHNIQUE IN COMPUTER SYSTEM

BACKGROUND OF THE INVENTION

The invention relates generally to computer systems, and deals more particularly with a buffering technique to expedite transfer of data between an application program executing in a computer and an external source or destination of the data.

In a typical network environment, a server computer manages resources such as a direct access storage device (DASD) which contains data required or written by an application executing in a client computer. If the data is extensive it is important to expedite the rate of data transfer. There are three "legs" of the data's journey from the DASD to the application in the case of a read operation-fetching from the DASD and movement within the server computer, transmission along a cable or through air waves, and receipt and movement within the client computer. Likewise, there are three legs of the data's journey from the client computer to the DASD in the case of a write operation-movement within the client computer, transmission along the medium, and movement within the server computer and receipt in the DASD. The present invention focusses on the data movement within the client computer or within the server computer for both read and write operations.

A prior art Network File System (NFS) with an IBM OS/2 operating system was structured as follows. The client computer included a buffer interposed between the transmission medium and the client application such that the data need only make one "stop" before being available to the client application from the transmission medium in the case of a read or to the transmission medium in the case of a write. This in itself was an improvement by the NFS system over other systems which required two sequential stops for the data, first into a system receipt buffer and then into an application buffer in the case of a read or first in an application buffer and then into a system transmit buffer in the case of a write. Naturally, a single stop is faster than two sequential stops, and viable provided necessary processes and safeguards are utilized. These include allocation of memory for the buffer, pinning of the allocated memory (marking of the addresses to prevent page-out of the RAM buffer to DASD), buffer definition and checking of access rights by the application to the buffer.

In the NFS system, to further expedite the data transfer, the buffer was "pre-allocated", i.e. defined at the beginning of the application execution before the data transfer was actually needed. Thus, when the data transfer was actually needed, there was no time consumed in defining the buffer. The buffer definition was initiated by a request from the application to a system function (a "device driver"). In response, the system function allocated the buffer of the size requested by the application. Then, the system function returned the starting address of the data buffer to the application. Later when the application requested to read data from or write data to the server, the application provided to the system function the starting address of the buffer that was to be used for the data transfer.

It should be noted that before a buffer could be used, three time consuming events need occur—pinning, access checking and address conversion. Pinning and access rights checking were described above, and "address conversion" is the process of converting an address utilized by the application to an address utilized by the system function that manages the buffer. For example, the application may support only virtual addresses whereas the system function may support only physical addresses. In the NFS system, at least one of these time consuming events occurred during processing of a data transfer request.

For a DosRead/DosWrite request, the application specifies the address of its source or target buffer in its own address space (virtual or linear). This address is pinned, checked for appropriate access rights, and converted to a system physical address by an OS/2 kernel before being passed to the Device Driver.

For a DosDevIOCtl scatter/gather list request, during processing of a data transfer request, the application uses a series of virtual or linear addresses to specify a list of buffers to which data is to be scattered, or from which it is to be gathered. This list of addresses is contained in a parameter structure and communicated across the application-to-device driver interface by another address. In this case, the device driver, not the kernel, must pin and verify access rights of first the parameter structure, then do exactly the same operation for each address in the scatter/gather list (including conversion to a physical address if the address is to be used for DMA targeting).

For a second, more efficient type of DosDevIOCtl request, buffers were previously available in pinned, physical storage. During processing of a data transfer request, the application filled-in a data structure in its memory space that included the physical address of the desired buffer. Though the physical address of the buffer communicated inside the parameter structure was pre-mapped to the device driver, the address of the parameter structure itself had to be passed by the application during processing of a data transfer request. While this eliminated the need to perform physical locking and access rights verification of the data buffer, the parameter structure access rights had to be verified before the address information contained inside could be used by the device driver to access the pre-mapped data buffer.

While the foregoing NFS system was expeditious in transferring data between the server and an application executing in the client computer by requiring only one stop in the data transfer and avoiding some of the foregoing events during run-time, improvements are desired to further expedite the data transfer rate.

Accordingly, an object of the present invention is to further expedite the rate of data transfer between an application executing in a computer and a communications adapter or other I/O device of the computer.

SUMMARY OF THE INVENTION

The invention resides in a computer system for executing an application that requires transfer of data to or from the computer system. The system responds to requests from the application prior to receiving a data transfer request, by allocating storage for a data buffer, verifying that the application is authorized to access the buffer, converting an address of the buffer utilized by the application to a corresponding system address and mapping the system buffer address to an index. The system also responds to a transmit or receive request from the application, by accessing the data buffer based on the index such that no storage allocation, address conversion, or access verification is required during processing of the transmit or receive request. Thus, the processing of data transfer requests are expeditious; all the time consuming tasks were performed before the data transfer requests were made.

According to other features of the present invention, the buffer is also pinned before data transfer requests are made such that no pinning is required during processing of a data transfer request. Also, the computer system includes a communications adapter at an input or output port of the computer system. The data is transferred between the communications adapter and the buffer without any intermediary buffering. This further expedites the data transfer.

DETAILED DESCRIPTION OF THE PREFERRED EMBODIMENTS

Figure 1:
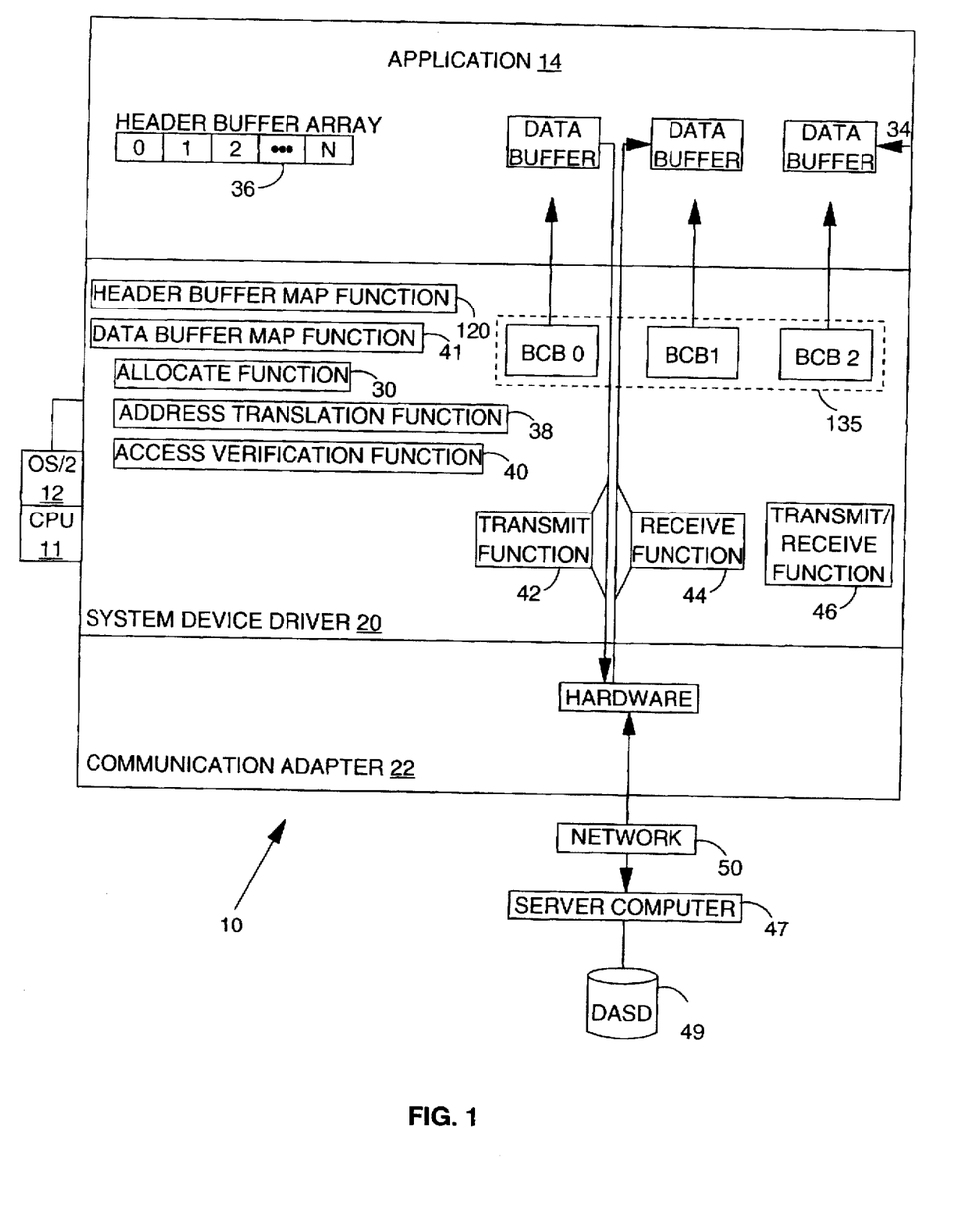
FIG. 1 is a block diagram of a computer system according to the present invention.

Referring now to the figures in detail, wherein like reference numbers indicate like elements throughout, FIG. 1 illustrates a client computer generally designated 10 according to the present invention. (However, it should be noted that computer 10 could also be a server computer or a pier computer.) Client computer 10 comprises a CPU 11, an operating system 12 for controlling execution of an application 14, a system device driver 20 for managing application requests to define buffers, transfer data and receive data, and a communications adapter 22 which attaches the client computer to a network 50. Access to the communications adapter 22 is controlled by the device driver 20.

Device driver 20 includes several functions performed prior to data transfer requests as follows. An "allocate" function 30 (in OS/2 operating system called "VMALLOC") performs the function of allocating pinned storage from which to form data buffers 34 and an array 36 of header buffers which include parameters. An "access verification" function 40 (in OS/2 operating system called "VERIFY ACCESS") performs the function of verifying that an application has authority to access a region of memory allocated for the data buffers and parameter buffers. An "address translation" function 38 (in OS/2 operating system called "LinToGDTSelector") performs the function of translating one type of addresses, such as linear addresses used by the application 14 to another type of addresses, such as virtual addresses used by the device driver 20. A mapping function 41 performs the function of mapping application selected indices to the data and header buffers 34 and 36. As described in more detail below, the allocate, address translation, access verification and mapping functions are invoked before data transfer requests are made and the resultant information is stored for immediate use so as not to delay the subsequent data transfer operations.

The device driver 20 also includes several data transfer functions as follows. A transmit function 42 performs the function of initiating a DMA transfer of the data from the application data buffers to the communications adapter 22 which sends the data via the network 50 to an external destination such as server computer 47 with DASD 49. A receive function 44 performs the function of receiving the data from an external source, such as server computer 47 with DASD 49, into the data buffers with the help of the communications adapter 22. A combined transmit and receive function 46 performs both functions atomically. The communications adapter 22 comprises hardware to support the transmit, receive and transmit/receive functions.

Figure 2:
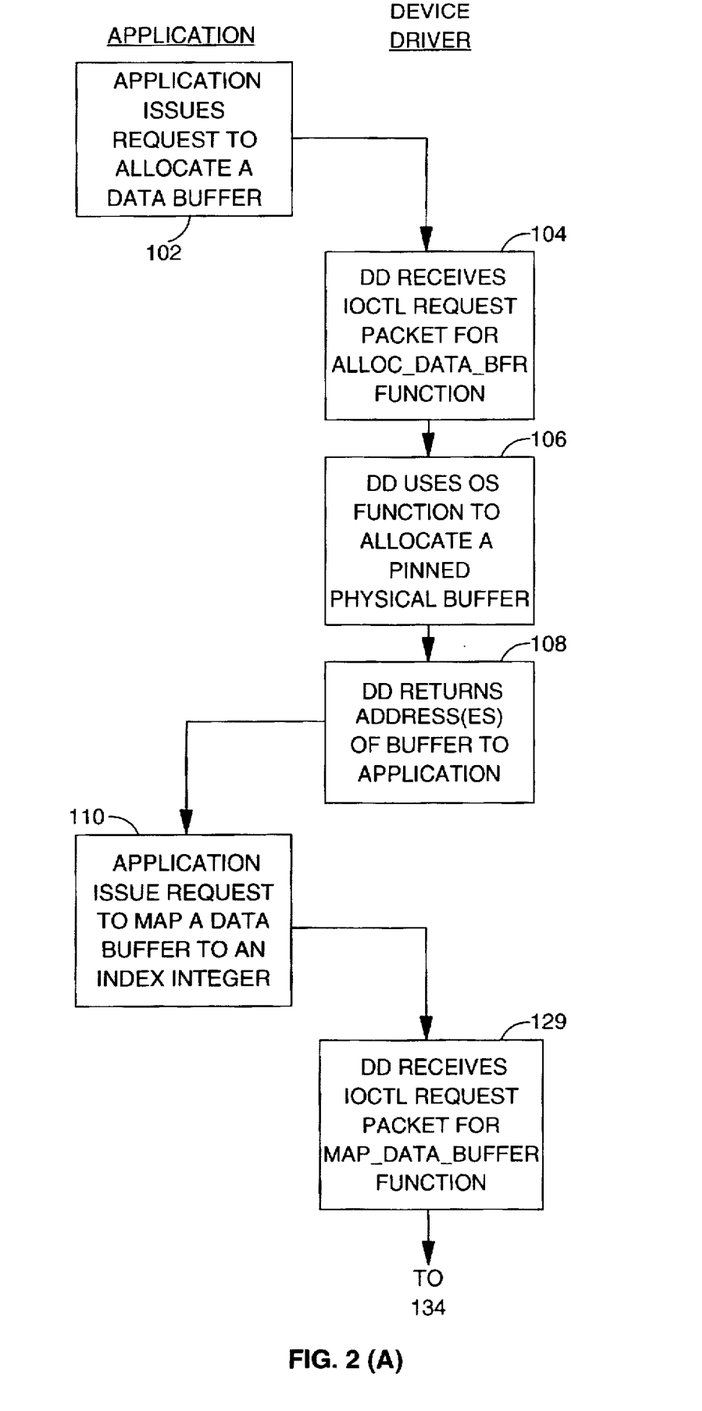
FIGS. 2(a) and 2(b) form a flow chart of a buffer pre-allocation stage during operation of the computer system of FIG. 1.

The following is a more detailed description of the operation of client computer 10. FIGS. 2(a) and (b) illustrate a buffer pre-allocation which is performed before a data transfer request. When application 14 begins to execute, before it needs to transfer or receive data, application 14 issues a request to system device driver 20 to pre-allocate pinned application data buffer of a specified size (step 102). However, the present invention can be used with other operating systems and recognize pre-allocation requests in other formats. In response to the request, device driver 20 is invoked at its allocation function 30 (step 104). Next, the allocation function calls the operating system 12 to allocate storage for a buffer and pin the buffer (step 106). After completing this task, the operating system returns three addresses defining the buffer to the device driver—a physical address of the start of the buffer, a system linear address of the buffer 34 used by the application 14 to call the mapping function and a process linear address of the buffer used by the application 14 to create or use data in the buffer. Then, the device driver returns these three addresses defining the buffer to the application (step 108). Because the allocation and pinning functions are performed before data transfer requests are made, these functions do not delay the data transfer when requested.

After receiving and storing these three addresses, the application issues a request to the device driver to map the buffer to an application selected index (integer). This request includes the three addresses defining the buffer 34 and the application selected index integer (step 110). As described in more detail below, after the mapping, the application can identify the buffer to the device driver simply by specifying the index. In response to the mapping request, the device driver invokes buffer mapping function 41 (step 129). The buffer mapping function calls the operating system 12 to check whether the application 14 has authority to access the region of storage forming the data buffer requested for mapping. In response, the operating system checks a table of its own which lists which regions of memory can be accessed by the application 14 (step 134). Assuming the access is authorized, the buffer mapping function then converts the three buffer addresses to a form supported by the device driver, for example, virtual addresses (step 134). Then, the buffer mapping function 120 generates an array 135 for "buffer control blocks", one for each application index (shown as 0,1,2 . . .). Each buffer control block includes the three addresses defining the respective data buffer (step 136). Each of the buffer control blocks also includes control information (i.e. status information, in-use flags, etc.) for subsequent access to the respective data buffer. Steps 104–136 are repeated for each data buffer required for subsequent run-time transmit, receive and transmit/receive operations. As described in more detail below, each transmit operation requires one data buffer, each receive operation requires one data buffer and each transmit/receive operation requires two data buffers. Each data buffer is mapped to a different index integer. Because of the foregoing mapping which is implemented before data transfer requests are made, the device driver can subsequently access each data buffer directly and quickly without any access checking or address conversion delays during processing of a data transfer request.

After completing step 136, the device driver returns an acknowledgement to the application 14, and the application 14 creates a parameter buffer area in memory previously allocated to the application (step 105). The parameter buffer area contains array 36 of header buffers that will subsequently hold message transmit control parameters or message receive control parameters. These parameters include the destination identification for transmit or source identification for receive, message length, time-out or extended result codes. The application then issues a request to the device driver to map the header buffer array (step 154). This request includes the starting address of the header buffer array and the total number of header buffers in the array. (Since the size of an individual header buffer is fixed, and known to both the application 14 and device driver 20, the total memory associated with the header buffer array 36 is implied.) In response, the device driver invokes the buffer mapping function 120 (step 160). The buffer mapping function calls the operating system to verify the right of the application to access the region in memory containing the header buffer array and, if access is authorized, convert the header buffer array address to a form supported by the device driver, for example, real addresses. After this mapping, the application can reference each header buffer by its relative position in the array, for example, first, second, etc. Steps 150–162 are usually performed just once, after all the data buffers are defined in steps 102–136. Each transmit or receive operation requires one header buffer, and the header buffer array includes enough header buffers to accommodate the anticipated number of transmit and receive operations that might be simultaneously active. Because of the foregoing mapping, the device driver can now access each header buffer directly and quickly without any access checking or address conversion delays during processing of a data transfer request.

Figure 3:
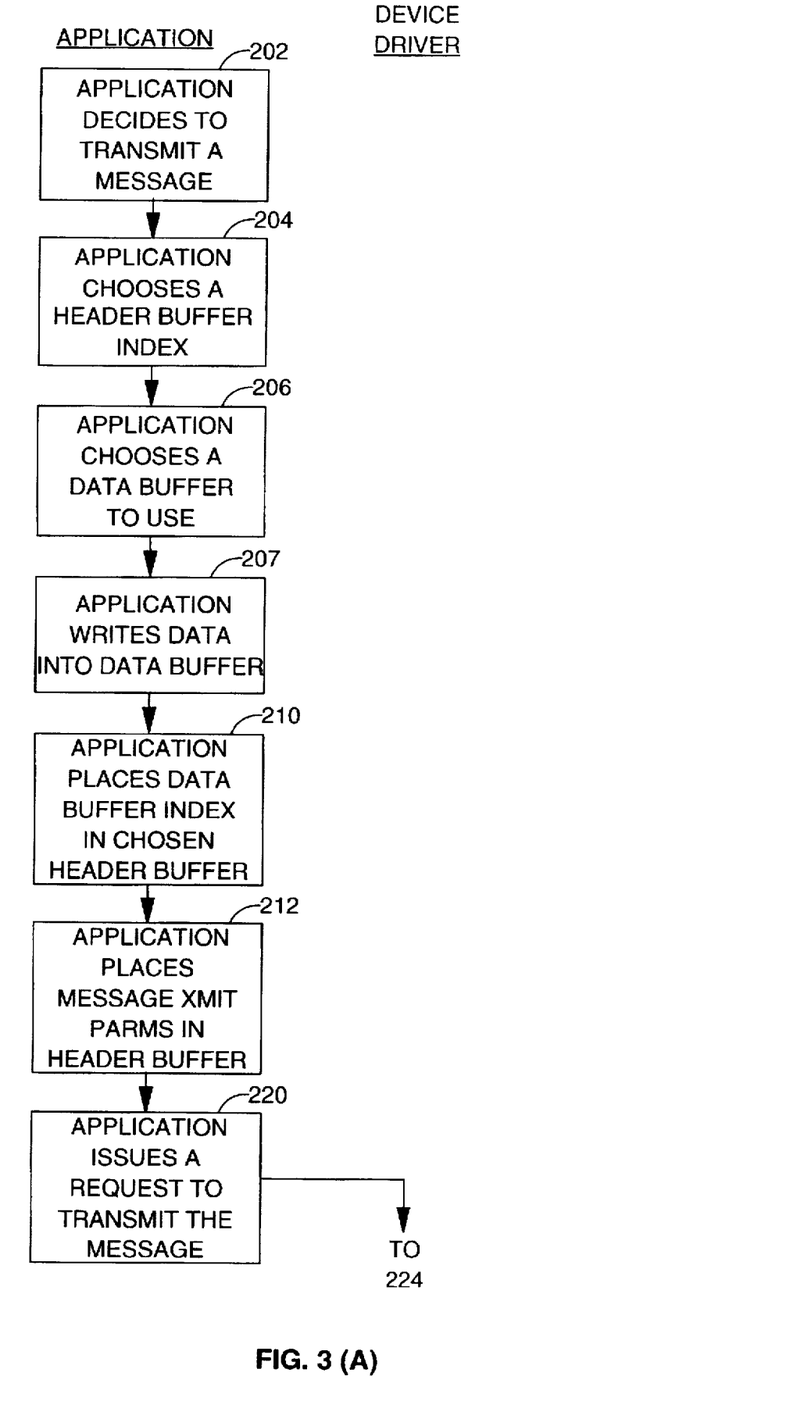
FIGS. 3(a) and 3(b) form a flow chart of a transmit stage during data transfer operations of the computer system of FIG. 1.
Figure 4:
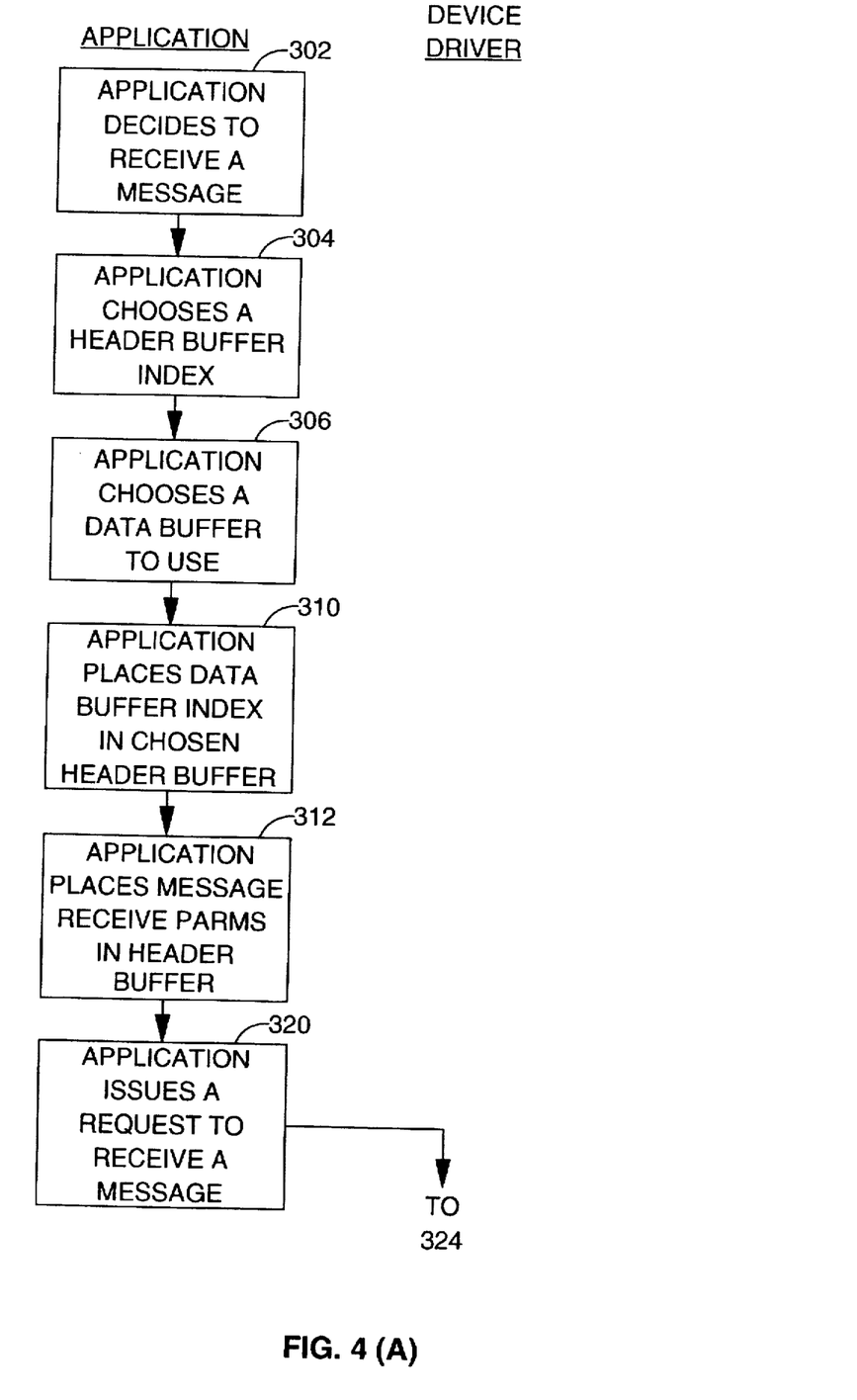
FIGS. 4(a) and 4(b) form a flow chart of a receive stage during data transfer operations of the computer system of FIG. 1.

FIGS. 3(a) and (b) illustrate data transfer operations, subsequent to the pre-allocation stage 100, for transmission of data from application 14 in client computer 10 to an external destination such as server computer 47. Then application 14 writes data, for example a message requesting video data, into one of its data buffers 34 (step 207) and notes the data buffer index. The application decides to transmit the data to an external destination (step 202) and selects one of the header buffers in array 36 (step 204). Next, the Application chooses a data buffer to use (step 206). Next, the application writes the data buffer index and message transmit parameters into the selected header buffer (steps 210 and 212). Then, the application issues a request to the device driver to transmit the message (step 220). This request consists of the transmit verb and the header buffer index. In accordance with the present invention, this data transfer stage does not include requests for buffer allocation, pinning, access verification, any addresses defining the data buffer or header buffer or address translation; this was all done earlier. In response to the request, the device driver 20 invokes a transmit message function (step 224) which extracts the header buffer index from the request (step 230) and then accesses the transmit message parameters and data buffer index from the header buffer (step 234). Finally, using the transmit message parameters, the transmit message function initiates the transfer of the data from the data buffer to the external destination using the communications adapter hardware and transmission medium (step 240). FIGS. 4(a) and (b) illustrate operation during processing of a data transfer request, subsequent to the pre-allocation stage 100, for a data read or receipt from an external source such as computer 47 to application 14. Application 14 decides to receive the data from the external source (step 302) and then selects one of the header buffers in array 36 (step 304). Next, the application selects a data buffer into which to receive the data (step 306) and writes the data buffer index and message receipt parameters into the selected header buffer (steps 310 and 312). Then, the application issues a request to the device driver to receive the message (step 320). This request consists of the receive verb and the header buffer index. In accordance with the present invention, this data transfer stage does not include requests for buffer allocation, pinning or access verification or any addresses defining the data buffer or header buffer or any address translations; this was all done earlier. In response to the receive request, the device driver 20 invokes a receive message function (324) which extracts the header buffer index from the request (step 330) and then accesses the receive message parameters and data buffer index from the header buffer (step 334). Finally, using the receive message parameters, the receive message function receives the data from the transmission medium and communications adapter hardware into the indicated data buffer (step 340).

Figure 5:
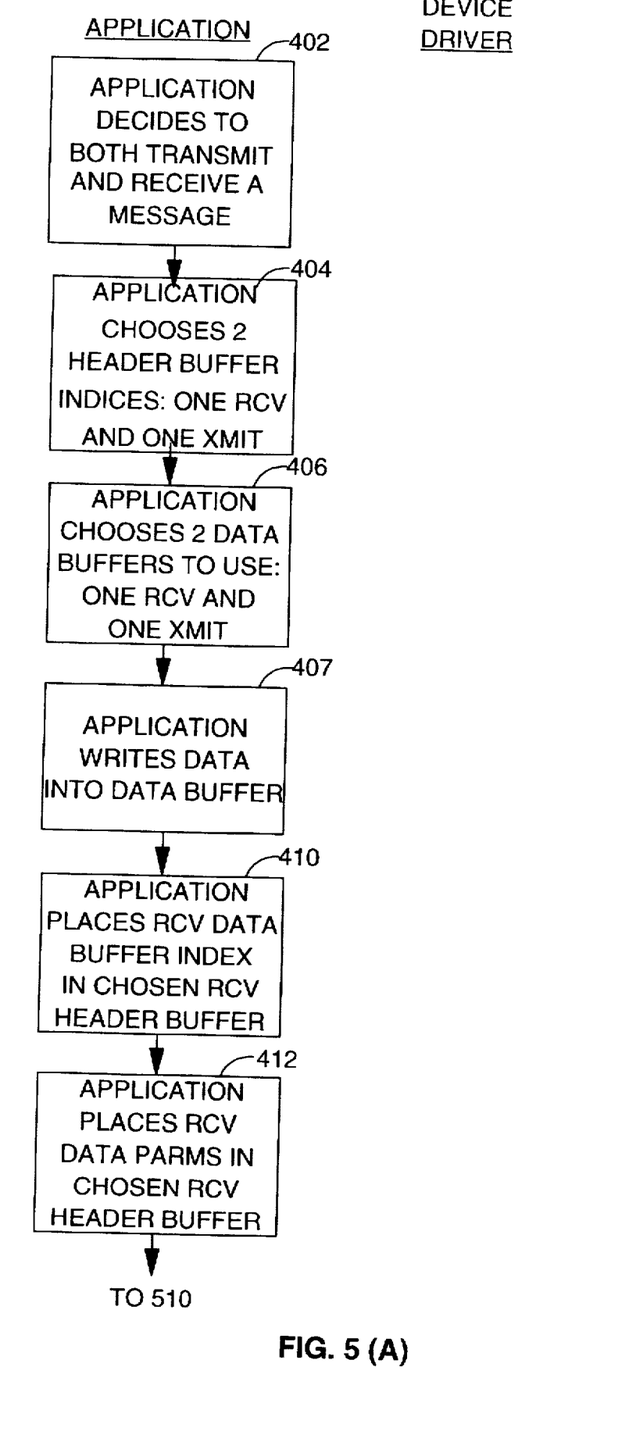
FIGS. 5(a), 5(b) and 5(c) form a flow chart of a transmit/receive stage during data transfer operations of the computer system of FIG. 1.
Figure 5C:
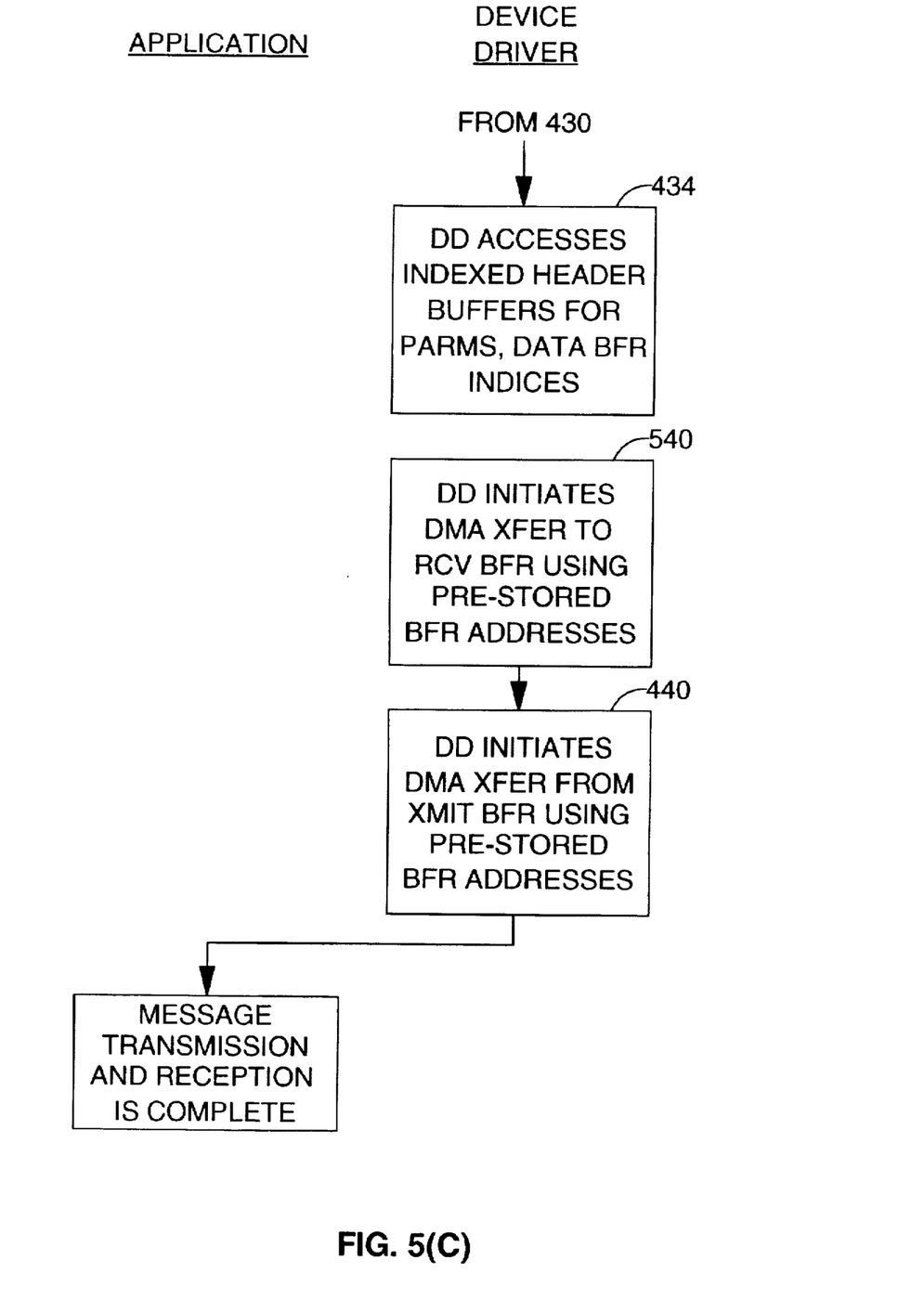

FIGS. 5(a), 5(b) and 5(c) illustrate operation during processing of a data transfer request, subsequent to the pre-allocation stage 100, for a data transmission from application 14 to an external destination such as server computer 47 and a responsive data reception from the same external source. The application decides to transmit the message to the server computer 47 and receive responsive data from the server computer (step 402). The application also selects two indices for two header buffers in array 36, one for the transmit operation and one for the receive operation (step 404). Next, the application chooses two data buffers to use, one for receive and one for transmit (step 406). Application 14 writes data, for example a message requesting video data from server computer 47, into one of its data buffers 34 (step 407) and notes the data buffer index. Next, the application writes the data buffer index and the corresponding message receive parameters into the selected header buffer for the receive operation (steps 410 and 412). The application writes the data buffer index containing the written data and corresponding message transmit parameters in the selected header buffer for the transmit operation (steps 510 and 512). Then, the application issues a request to the device driver to transmit the written message to the destination and receive the other message from the server computer (step 420). The transmit/receive request consists of the combined transmit_receive verb and two corresponding header buffer indices. In accordance with the present invention, this data transfer stage does not include requests for buffer allocation, pinning or access verification or any addresses defining the data buffer or header buffer or any address translations; this was all done earlier. In response to the request, the device driver 20 invokes the transmit/receive message function (step 424) which extracts both header buffer indices from the request (step 430). Then, the transmit/receive function accesses the transmit message parameters and transmit data buffer index from the transmit header buffer and the receive message parameters and receive data buffer index from the receive header buffer (step 434). Next, using the receive message parameters, the transmit/receive message function prepares to receive the data from the communications adapter hardware into data buffer (step 540). Finally, using the transmit message parameters, the transmit message function initiates the transfer of the data from the data buffer to the destination using the communications adapter hardware and transmission medium (step 440). The preparation for the receive is initiated in step 540 before the message transmission in step 440, so that the receive buffers are guaranteed to be ready when the responsive video data arrives.

Based on the foregoing, a buffering technique according to the present invention has been disclosed. However, numerous modifications and substitutions can be made without deviating from the scope of the present invention. For example, the same buffering technique can be used in the server computer 47 or other types of computers. Different formats for the receive and transmission requests can also be utilized depending on the underlying operating system and other application program interfaces. Therefore, the present invention has been disclosed by way of illustration and not limitation, and reference should be made to the following claims to determine the scope of the present invention.

We claim:

1. A computer system for executing an application that requires transfer of data to or from said computer system, said system comprising:

means, responsive to a request by said application to allocate a data buffer for said application, for allocating storage for said buffer and supplying one or more addresses of said buffer to said application;

means, responsive to a subsequent request by said application to map said buffer to an index, said subsequent request including at least one of said addresses, for verifying that said application is authorized to access said buffer and mapping said at least one address to said index; and means, responsive to a transmit or receive request by said application subsequent to the allocate and map requests, for accessing said buffer based on said index.

2. A computer system as set forth in claim 1 further comprising means for pinning said buffer before said transmit or receive request is made.

3. A computer system as set forth in claim 1 further comprising:

a communications adapter at an input or output port of said computer system;

communication lines at an input or output port of said communications adapter to transfer data to or from said computer system; and means for transferring said data between said communication lines and said buffer under control of said communications adapter without any intermediary buffering.

4. A computer system as set forth in claim 1 wherein said application selects said index.

5. A computer system as set forth in claim 1 wherein the mapping means converts said at least one address to a corresponding system address and then maps said system address to said index.

6. A computer system as set forth in claim 1 wherein said application selects said index, and said request by said application to map said buffer to an index includes a specification of said index.

7. A computer system for executing an application that requires transfer of data to or from said computer system, said system comprising:

means, responsive to a request by said application to allocate a data buffer for said application, for allocating storage for said buffer, pinning said buffer, and supplying one or more addresses of said buffer to said application;

means, responsive to a subsequent request by said application to map said data buffer to an index, said subsequent request including at least one of said addresses, for verifying that said application is authorized to access said buffer and mapping said at least one address to said index; and means, responsive to a transmit or receive request by said application subsequent to said allocate and map requests, for accessing said buffer based on said index such that no storage allocation, pinning, or access verification is required for said buffer to process said transmit or receive request after said transmit or receive request is made.

8. A computer system as set forth in claim 7 further comprising:

means, responsive to another request by said application before said transmit or receive request is made, subsequent to said map request, to map a header buffer array for parameters for said transmit or receive request, for verifying that said application is authorized to access said header buffer array and converting an address of said header buffer array supplied by said application to a corresponding system address.

9. A computer system as set forth in claim 8 further comprising means for storing a header buffer array index in association with the system address of said header buffer array.

10. A computer system as set forth in claim 9 further comprising:

means, responsive to said transmit or receive request by said application, for accessing said header buffer array based on said header buffer array index to obtain parameters required to perform said transmit or receive request.

11. A computer system as set forth in claim 10 wherein said data buffer index is stored in said header buffer array and said header buffer array accessing means identifies said data buffer index from said header buffer array.

12. A method for executing an application that requires transfer of data to or from a computer which is executing said application, said method comprising the steps of:

in response to a request by said application to allocate a data buffer for said application, allocating storage for said data buffer and supplying one or more addresses of said buffer to said application;

in response to a subsequent request by said application to map said buffer to an index, said subsequent request including at least one of said addresses, verifying that said application is authorized to access said buffer and mapping said at least one address to said index; and in response to a transmit or receive request by said application subsequent to the allocating, verifying and mapping steps, accessing said buffer based on said index.

13. A method as set forth in claim 12 further comprising the step of pinning said buffer before said transmit or receive request is made.

14. A method as set forth in claim 12 wherein said computer includes a communications adapter at an input or output port of said computer and further comprises communication lines to transfer data to and from said computer system, and further comprising the step of transferring said data between said communication lines and said buffer under control of said communications adapter without any intermediary buffering.

15. A method as set forth in claim 12 wherein said application selects said index.

16. A method as set forth in claim 12 wherein the mapping step comprises the steps of converting said at least one address to a corresponding system address and then mapping said system address to said index.

17. A method as set forth in claim 12 wherein said application selects said index, and said request by said application to map said buffer to an index includes a specification of said index.

18. A computer program product for executing an application that requires transfer of data to or from a computer which is executing said application, said program product comprising:

a computer readable medium;

first program instruction means, responsive to a request by said application to allocate a data buffer for said application, for instructing a processor to allocate storage for said buffer and supply one or more addresses of said buffer to said application;

second program instruction means, responsive to a subsequent request by said application to map said buffer to an index, said subsequent request including at least one of said addresses, for instructing a processor to verify that said application is authorized to access said buffer and map said at least one address to said index; and third program instruction means, responsive to a transmit or receive request by said application subsequent to the allocate and map requests, for instructing a processor to access said data buffer based on said index; and wherein said first, second and third program instruction means are recorded on said medium.

19. A computer program product as set forth in claim 18 further comprising fourth program instruction means for instructing a processor to pin said buffer before said transmit or receive request is made; and wherein said fourth program instruction means is recorded on said medium.

20. A computer program product as set forth in claim 18 wherein said computer includes a communications adapter at an input or output port of said computer, communication lines being coupled to an input or output port of said communications adapter to transfer data to or from said computer, and further comprising fourth program instruction means for transferring said data between said communication lines and said buffer under control of said communications adapter without any intermediary buffering, and wherein said fourth program instruction means is recorded on said medium.

* * * * *